US012315040B2

(12) United States Patent
Kim et al.

(10) Patent No.: US 12,315,040 B2
(45) Date of Patent: May 27, 2025

(54) METHOD AND DEVICE FOR IMAGING OF LENSLESS HYPERSPECTRAL IMAGE

(71) Applicant: Korea Advanced Institute of Science and Technology, Daejeon (KR)

(72) Inventors: Min Hyuk Kim, Daejeon (KR); Daniel Jeon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 250 days.

(21) Appl. No.: 17/272,542

(22) PCT Filed: Jan. 29, 2020

(86) PCT No.: PCT/KR2020/001346
§ 371 (c)(1),
(2) Date: Mar. 1, 2021

(87) PCT Pub. No.: WO2020/159223
PCT Pub. Date: Aug. 6, 2020

(65) Prior Publication Data
US 2021/0350590 A1 Nov. 11, 2021

(30) Foreign Application Priority Data

Jan. 29, 2019 (KR) .................. 10-2019-0010977
Jun. 17, 2019 (KR) .................. 10-2019-0071347
Aug. 8, 2019 (KR) .................. 10-2019-0096565

(51) Int. Cl.
*G06K 9/00* (2022.01)
*G01J 3/18* (2006.01)
(Continued)

(52) U.S. Cl.
CPC ............... *G06T 11/001* (2013.01); *G01J 3/18* (2013.01); *G01J 3/2823* (2013.01);
(Continued)

(58) Field of Classification Search
CPC .... G01J 3/2823; G01J 2003/2826; G01J 3/18; G01J 3/28; G01J 1/02; G01J 1/0242;
(Continued)

(56) References Cited

U.S. PATENT DOCUMENTS 5,576,548 A * 11/1996 Clarke ................. A61B 6/5258
250/369
7,385,705 B1 * 6/2008 Hoctor .................. G02B 26/06
356/456
(Continued)

FOREIGN PATENT DOCUMENTS

JP 2017191071 A 10/2017
KR 20170131526 A 11/2017
KR 20180027887 A 3/2018

OTHER PUBLICATIONS

Belthangady, et al., "Applications, Promises, and Pitfalls of Deep Learning for Fluorescence Image Reconstruction," https://www.preprints.org/manuscript/201812.0137/v1; pp. 1-14; Dec. 11, 2018 (retrieved on Apr. 24, 2020).
(Continued)

*Primary Examiner* — Alex Kok S Liew
(74) *Attorney, Agent, or Firm* — ArentFox Schiff LLP; Joseph M. Maraia (57) ABSTRACT

Disclosed are a hyperspectral imaging method and an apparatus thereof. A method of reconstructing a hyperspectral image includes receiving an image photographed through a diffractive optical element and reconstructing a hyperspectral image of the received image based on the received image and information about a point spread function for each wavelength of the diffractive optical element. The diffractive optical element may generate an anisotropic shape of the point spread function that varies with a spectrum.

18 Claims, 5 Drawing Sheets

(51) Int. Cl.
*G01J 3/28* (2006.01)
*G02B 27/42* (2006.01)
*G06N 3/08* (2023.01)
*G06T 11/00* (2006.01)

(52) U.S. Cl.
CPC ........... *G02B 27/4205* (2013.01); *G06N 3/08* (2013.01); *G01J 2003/2826* (2013.01)

(58) Field of Classification Search
CPC .... G01J 1/04; G01J 1/0414; G01J 1/08; G01J 1/4228; G01J 2001/4266; G01J 2003/1234; G01J 2003/1247; G01J 2005/0077; G01J 3/0208; G01J 3/021; G01J 3/0229; G01J 3/0232; G01J 3/0254; G01J 3/0297; G01J 3/10; G01J 3/26; G01J 3/2803; G01J 3/36; G01J 3/51; G01J 5/02; G01J 5/0275; G01J 5/08; G01J 5/0808; G01J 5/0846; G01J 5/53
See application file for complete search history.

(56) References Cited

U.S. PATENT DOCUMENTS

| | | | |
|---|---|---|---|
| 2014/0268162 A1 | 9/2014 | Farah | |
| 2017/0059408 A1* | 3/2017 | Körner | G01J 3/0229 |
| 2017/0176338 A1* | 6/2017 | Wu | G02B 21/367 |
| 2018/0052050 A1 | 2/2018 | Menon et al. | |
| 2019/0238732 A1* | 8/2019 | Watanabe | G02B 7/36 |
| 2021/0350590 A1* | 11/2021 | Kim | G06T 5/60 |

OTHER PUBLICATIONS

Wu, et al., "Snapshot Hyperspectral Volumetric Microscopy," https://www.nature.com/articles/srep24624; vol. 6; pp. 1-10; Apr. 22, 2016 (retrieved on Apr. 24, 2020).
International Search Report from related PCT Application No. PCT/KR2020/001346 dated May 12, 2020.
Wang et al: "Computational Multi-Spectral Video Imaging", arxiv.org, Cornell University Library, 201 Olin Library Cornell University Ithaca, NY 14853, May 25, 2017 (May 25, 2017), XP081281431, DOI: 10.1364/JOSAA.35.000189.
Nikonorov et al: "Toward Ultralightweight Remote Sensing With Harmonic Lenses and Convolutional Neural Networks", IEEE Journal of Selected Topics in Applied Earth Observations and Remote Sensing, IEEE, USA, vol. 11, No. 9, Sep. 9, 2018 (Sep. 9, 2018), pp. 3338-3348, XP011689675, ISSN: 1939-1404, DOI: 10.1109/JSTARS.2018.2856538.
Choi et al: "High-Quality Hyperspectral Reconstruction Using a Spectral Prior", ACM Transactions on Graphics, ACM, NY, US, vol. 36, No. 6, Nov. 20, 2017 (Nov. 20, 2017), pp. 1-13, XP058473785, ISSN: 0730-0301, DOI: 10.1145/3130800.3130810.
Supplementary European Search Report dated Oct. 7, 2021, for related Application No. EP20748181.

* cited by examiner

METHOD AND DEVICE FOR IMAGING OF LENSLESS HYPERSPECTRAL IMAGE

CROSS REFERENCE TO RELATED APPLICATIONS

This is a U.S. National Stage Application, filed under 35 U.S.C. 371, of International Patent Application No. PCT/KR2020/001346, filed on Jan. 29, 2020, which claims priority to Korean patent application No. 10-2019-0010977, filed Jan. 29, 2019, Korean patent application No. 10-2019-0071347, filed on Jun. 17, 2019, and Korean patent application No. 10-2019-0096565, filed on Aug. 8, 2019, the contents of each are incorporated herein by reference in their entireties.

BACKGROUND

Embodiments of the inventive concept described herein relate to hyperspectral imaging technology, and more particularly, relate to a hyperspectral imaging method and an apparatus thereof capable of obtaining hyperspectral information by analyzing a point spread function for each region of an image, for example, a spectral region for each wavelength by reversely using a phenomenon in which the shape of a point spread function (PSF) of a picture taken through a diffractive optical element (DOE) is changed according to the spectrum of light reflected by a corresponding object.

A hyperspectral image has been used in a variety of sensing applications, such as biomedical inspection, material classification, material appearance acquisition, digital heritage preservation, forensics, and the like. Based on geometric optics, various hyperspectral imaging systems have been developed for snapshots of dynamic objects, and include various optical elements, such as dispersive optical elements (e.g., prisms or diffraction grids), coded aperture masks, plural relay lenses, and object imaging systems, which result in excessively large form factors.

Hyperspectral imaging has been extensively studied in the last decade to enable physically meaningful imaging beyond human vision. Conventional methods may be classified into three types of spectral scanning, computed tomography (CT) imaging, and snapshot compression imaging. A scanning-based approach, which is based on a distributed optical element such as a prism or a diffraction grid, may capture light of each wavelength through a slit called a whiskbroom or pushbroom scanner. The scanning calculates high spatial and spectral resolution, but a target object is limited to a static object or a remote scene.

Computed tomography imaging spectrometry (CTIS) has been introduced to alleviate the limitation of the scanning method, which uses an image and a diffraction grid with a relay lens. The diffraction grid splits the collimated incident light into different diffraction patterns in different directions at the expense of the spatial resolution of computed tomography.

Coded aperture snapshot spectral imaging (CASSI) has been introduced to capture a dynamic object. The distributed optical element is coupled to an aperture coded through a relay lens to code a spatial or spectral signal. The compression input is then reconstructed. Both types of snapshot spectral images require some geometric optical elements to collimate and disperse light (or modulate light in the case of CASSI), which makes them bulky and practically unwieldy. Recently, although a compact spectral imaging method for improving mobility has been introduced in the related art, because the method is still based on geometric optical elements, a prism must be attached in front of a DSLR camera. The entire optical system is too large to be applied to a mobile device.

A diffractive optical element, such as a diffraction grid, has been commonly used in a traditional hyperspectral imager or a spectrometer due to its diffraction efficiency. Recently, the related art has introduced several diffraction filter arrangements for a multicolor image without a typical Bayer pattern color filter, but such a diffractive optical element must be installed through a geometric optical system with an additional imaging lens.

A traditional diffraction image is designed for monochromatic (or constant) light of a single wavelength due to chromatic aberration. Recently, diffraction RGB imaging has also been introduced for illumination of inconsistent illumination. The technique according to the related art has provided a colorless Fresnel lens which does not generate chromatic aberration by making an isotropic PSF that does not change over the entire visible spectrum. In addition, another technique according to the related art has presented a diffraction RGB image with adjustable optical parameters such as a focal length and zoom on the mechanical arrangement of two diffractive optical systems. A lensless image sensor using diffraction of a coded aperture according to the related art has been introduced. A target object located at a fixed distance may be captured as RGB images of three channels. A technique according to the related art has proposed an end-to-end optimization method of a diffractive optical element by employing a gradient-based optimization framework. In the case of a conventional diffraction image up to now, the related art has focused on the RGB image to enhance the focus, thereby capturing the all-in-focus image of the entire visible spectrum.

The point spread function (PSF) made by a diffractive optical element changes in shape depending on both wavelength and depth. For example, according to the related art, the PSF is rotated as the depth changes, and it has been found that this feature enables depth imaging under monochromatic illumination. In addition, according to the related art, a light field is captured from a snapshot captured by diffraction. The PSF of an optical element is a caustic pattern that changes depending on depth. According to the related art, a Fresnel zone aperture has been introduced to capture the light field by using the depth deformation of the PSF even with light whose illumination is not constant. This method captures depth or light fields by using the depth dependency of the PSF.

Unlike conventional RGB cameras, the snapshot spectral imager captures a compressed signal of a high density spectral sample, where the signal must be reconstructed by a post process. Because hyperspectral reconstruction causes a serious error problem due to the high-density spectral information output from monochrome and encoded images, several optimization approaches have been proposed by defining a specific natural image prior and a data accuracy item such as total variation, l1-norm regularization, or pre-trained dictionary. A common feature of this approach is the tradeoff between spatial resolution and spectral accuracy in the reconstructed result. According to the related art, a data-driven prior trained by using an automatic encoder network has been proposed for mitigating this tradeoff, and in addition, convolution sparse coding has been used as a hyperspectral prior. They have reduced the problem error by using data driving of a natural hyperspectral image as a means. However, such reconstruction is not an end-to-end optimization solution as a whole because the natural spectral prior is trained separately from the image reconstruction framework.

SUMMARY

Embodiments of the inventive concept provide a hyperspectral imaging method and an apparatus thereof capable of obtaining hyperspectral information by analyzing a point spread function for each region of an image, for example, a spectral region for each wavelength by reversely using a phenomenon in which the shape of a point spread function (PSF) of a picture taken through a diffractive optical element (DOE) is changed according to the spectrum of light reflected by a corresponding object.

According to an exemplary embodiment, a method of reconstructing a hyperspectral image includes receiving an image photographed through a diffractive optical element, and reconstructing a hyperspectral image of the received image based on the received image and information about a point spread function for each wavelength of the diffractive optical element.

The diffractive optical element may generate an anisotropic shape of the point spread function that varies with a spectrum.

The reconstructing of the hyperspectral image may include reconstructing the hyperspectral image of the received image based on the information about the point spread function for each wavelength, the received image, and a neural network trained by a previously generated learning model.

The neural network may learn a spatial prior and a spectral prior of the hyperspectral image by the learning model, and reconstruct a spectral image by diffractive rotation of the point spread function.

The reconstructing of the hyperspectral image may include reconstructing the hyperspectral image of the received image by reflecting an optimization technique for diffractive rotation of the point spread function.

The reconstructing of the hyperspectral image may include reconstructing the hyperspectral image of the received image by repeating the optimization technique a specified number of times.

The neural network may include multiphase neural network.

According to an exemplary embodiment, an apparatus for reconstructing a hyperspectral image includes a receiving unit that receives an image photographed through a diffractive optical element, and a reconstructing unit that reconstructs a hyperspectral image of the received image based on the received image and information about a point spread function for each wavelength of the diffractive optical element.

The diffractive optical element may generate an anisotropic shape of the point spread function that varies with a spectrum.

The reconstructing unit may reconstruct the hyperspectral image of the received image based on the information about the point spread function for each wavelength, the received image, and a neural network trained by a previously generated learning model.

The neural network may learn a spatial prior and a spectral prior of the hyperspectral image by the learning model, and reconstruct a spectral image by diffractive rotation of the point spread function.

The reconstructing unit may reconstruct the hyperspectral image of the received image by reflecting an optimization technique for diffractive rotation of the point spread function.

The reconstructing unit may reconstruct the hyperspectral image of the received image by repeating the optimization technique a specified number of times.

The neural network may include multiphase neural network.

According to an exemplary embodiment, a system for reconstructing a hyperspectral image includes a diffractive optical element, and a camera apparatus that takes an image through the diffractive optical element, and reconstructs a hyperspectral image of the photographed image based on a point spread function information for each wavelength of the diffractive optical element and the photographed image.

The diffractive optical element may generate an anisotropic shape of the point spread function that varies with a spectrum.

The camera apparatus may reconstruct the hyperspectral image of the received image based on the information about the point spread function for each wavelength, the received image, and a neural network trained by a previously generated learning model.

The camera apparatus may reconstruct the hyperspectral image of the received image by reflecting an optimization technique for diffractive rotation of the point spread function.

According to the embodiments of the inventive concept, by inversely using the phenomenon that the shape of the point spread function of the photograph taken through the diffractive optical element (DOE) varies depending on the spectrum of the light reflected by the corresponding object, the point spread function may be analyzed for each region of the image, thereby obtaining the hyperspectral information.

According to the embodiments of the inventive concept, a three-dimensional image may be generated by estimating the distance of an object using two small hyperspectral cameras capable of acquiring hyperspectral information.

According to the embodiments of the inventive concept, because the hyperspectral observation can be performed by using a lensless system, the size may be made very small compared to an existing hyperspectral observation system, so that it is possible to greatly increase the convenience in use due to such an advantage.

That is, the inventive concept may produce a diffractive optical pattern thinner than the thickness of a general lens through the diffractive optical element, and make it possible to make a lensless camera, that is, a camera having no lenses, by using an optical construction having a much smaller size than the optical elements of a conventional camera.

Therefore, the inventive concept may precisely form the object representation in special lighting such as neon signs, sodium lamps, halogen bulbs, and the like, may be implanted into wearable equipment, Internet of Things equipment through the size optimization to a ultra-thin camera, and may be applied to a healthcare service using non-invasive inspection characteristics, augmented reality (AR) using wearable hyperspectral acquisition equipment, and the like.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages and features of embodiments of the inventive concept, and method for achieving them will be apparent with reference to the accompanying drawings and detailed description that follows. But, it should be understood that the inventive concept is not limited to the following embodiments and may be embodied in different ways, and that the embodiments are given to provide complete disclosure of the inventive concept and to provide thorough understanding of the inventive concept to those skilled in the art, and the scope of the inventive concept is limited only by the accompanying claims and equivalents thereof.

The terms used in the present disclosure are provided to describe embodiments, not intended to limit the inventive concept. In the present disclosure, singular forms are intended to include plural forms unless the context clearly indicates otherwise. It will be further understood that the terms "comprises," and/or "comprising," used herein, specify the presence of stated elements, but do not preclude the presence or addition of one or more other elements.

Unless otherwise defined, all terms used herein (including technical or scientific terms) have the same meanings as those generally understood by those skilled in the art to which the inventive concept pertains. Such terms as those defined in a generally used dictionary are not to be interpreted as having ideal or excessively formal meanings unless defined clearly and specifically.

Hereinafter, exemplary embodiments of the present disclosure will be described in detail with reference to the accompanying drawings. The same reference numerals are used for the same components in the drawings, and duplicate descriptions of the same components are omitted.

A conventional snapshot hyperspectral imaging system includes several optical elements such as a prism, a coded aperture, multiple relay lenses, an imaging lens, and the like, thereby resulting in an excessively large form factor.

Figure 1:
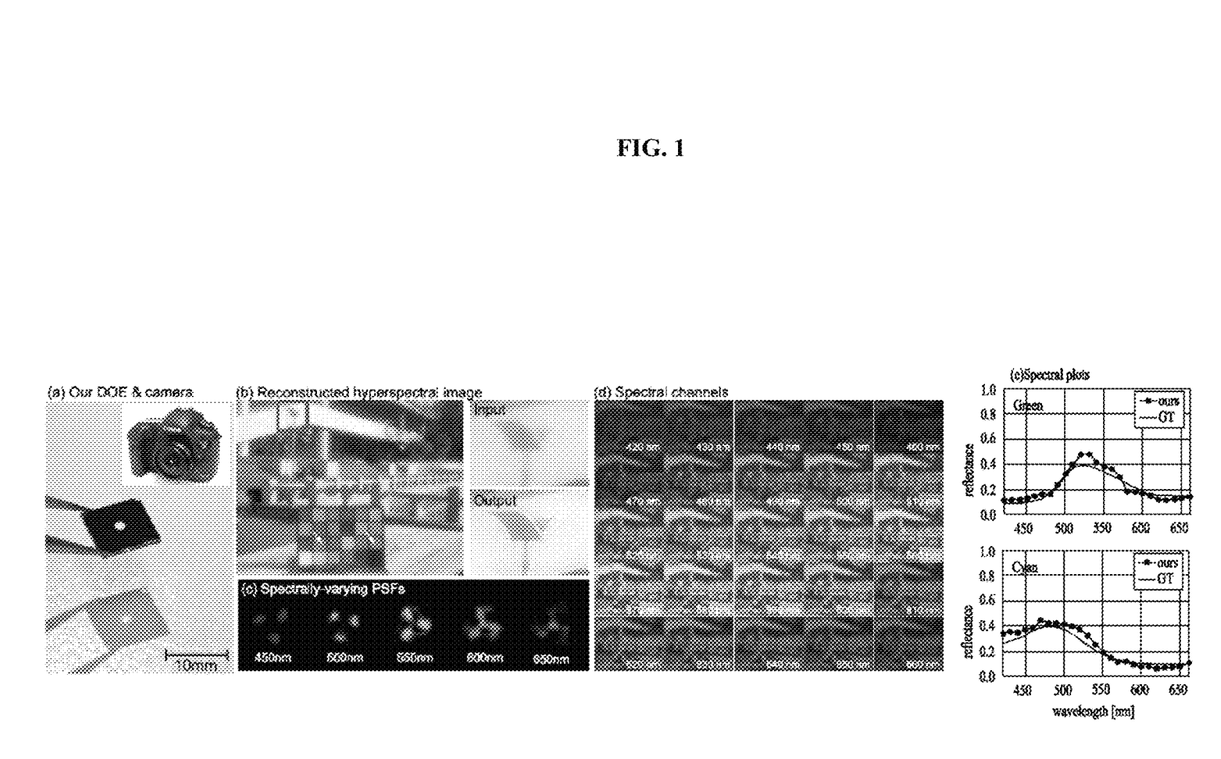
FIG. 1 is a view comparing a method according to the inventive concept with methods according to the related art.

To overcome such limitation in mobility in the conventional snapshot hyperspectral imaging system, the inventive concept seeks an alternative and minimal optical system for hyperspectral imaging based on recent advances in diffractive optical technology. To this end, the inventive concept proposes a compact snapshot hyperspectral imaging method that replaces a conventional optical element of a hyperspectral image with a single diffractive optical element (DOE) that can be directly attached to a typical bare image sensor. As shown in FIG. 1A, because the inventive concept uses DOE, many optical elements may be avoided and the influence on the form factor is minimal, so that a general user may freely capture the hyperspectral image. That is, the inventive concept enables snapshot spectral imaging by capturing snapshots with continuous dispersion using a single diffractive optical element.

There are two major technical challenges to capturing a hyperspectral image by using a single diffractive imaging lens. First, because the chromatic aberration is increased due to the physical phenomenon that the size of the isotropic point spread function (PSF) varies depending on the wavelength, a conventional diffraction lens is not suitable for full-spectrum imaging in an environment where illumination is not constant. Secondly, because there is no diffraction factor for dispersion and no coded aperture mask, the spectral signal through DOE is widespread and a large kernel deconvolution is required for spectral reconstruction. Thus, the error in the spectral reconstruction increases much more in the diffraction image setup than in the typical compressed spectral image setup.

In order to solve this problem, the inventive concept contributes as follows.

First, to minimize the form factor of spectral imaging optics, a new design that combines two main functions of dispersion and imaging for hyperspectral imaging into a single diffractive optical element is introduced. The inventive concept utilizes the wavelength dependence of Fresnel diffraction to produce an anisotropic shape of the point spread function in which the DOE design changes spectrally. Unlike traditional Fresnel lenses, the PSF size is actually unchanged, but instead the PSF shape rotates as the wavelength of light changes. The spectral diffractive rotation property of the anisotropic PSF is a critical signal of the spectral reconstruction.

Second, an end-to-end reconstruction network is designed to alleviate the error of increased spectral reconstruction due to the absence of a general optical element. A network according to the inventive concept may be designed from a condition optimization procedure with a spatial spectral prior that processes a point spread function (PSF) varying spectrally. In detail, the inventive concept can design a data-driven prior optimization network solution that learn the spatial spectral characteristics of natural spectral images, thereby enabling robust end-to-end hyperspectral reconstruction from diffractive rotation.

This faithfully reconstructs the spectral information from diffractive rotation, instead of applying a conventional optimization method with hand-crafted prior. In summary, three new contributions of the inventive concept are as follows.

(1) By adopting a diffractive imaging lens that induces an anisotropic shape of a spectrally varying point spread function, imaging and dispersion are achieved with a single DOE.

(2) By developing an optimization reconstruction network with a spatial spectral prior, errors in spectral reconstruction in diffraction image setup is alleviated.

(3) A diffraction imaging system with a minimum form factor of an optical system is proposed based on DOE, so that this is thinner than that of an existing systems.

FIG. 1 is a view illustrating a hyperspectral imaging method according to an embodiment of the inventive concept. The inventive concept relates to a compact snapshot hyperspectral imaging method in which a new diffractive optical element (DOE) is attached to a conventional bare image sensor.

The hyperspectral imaging method of the inventive concept may replace general optical elements of hyperspectral images, such as prisms, coded masks, relays, and imaging lenses with a single optical element. The diffractive imaging lens in a method according to the inventive concept is thinner than the lens of a conventional hyperspectral optical system. In addition, the lens design of the method according to the inventive concept may be combined with a data driving spectral reconstruction method that can recover spectral information extracted from the point spread function according to the spectrum.

FIG. 1A illustrates a DSLR camera equipped with an ultrathin DOE. FIG. 1B illustrates an example of a reconstructed hyperspectral image generated from an actual input. FIG. 1C illustrates a spectral-variable point spread function measured for each wavelength. FIG. 1D illustrates captured spectral channels. FIG. 1E illustrates spectral plots for two patches of a color checker compared with ground truth.

As illustrated in FIG. 1, the inventive concept may analyze a PSF varying spectrally with a wavelength and obtain hyperspectral information by using a space spectral prior such as a neural network of U-Net structure that processes the PSF varying spectrally, thereby obtaining a hyperspectral image by using a single DOE.

Figure 2:
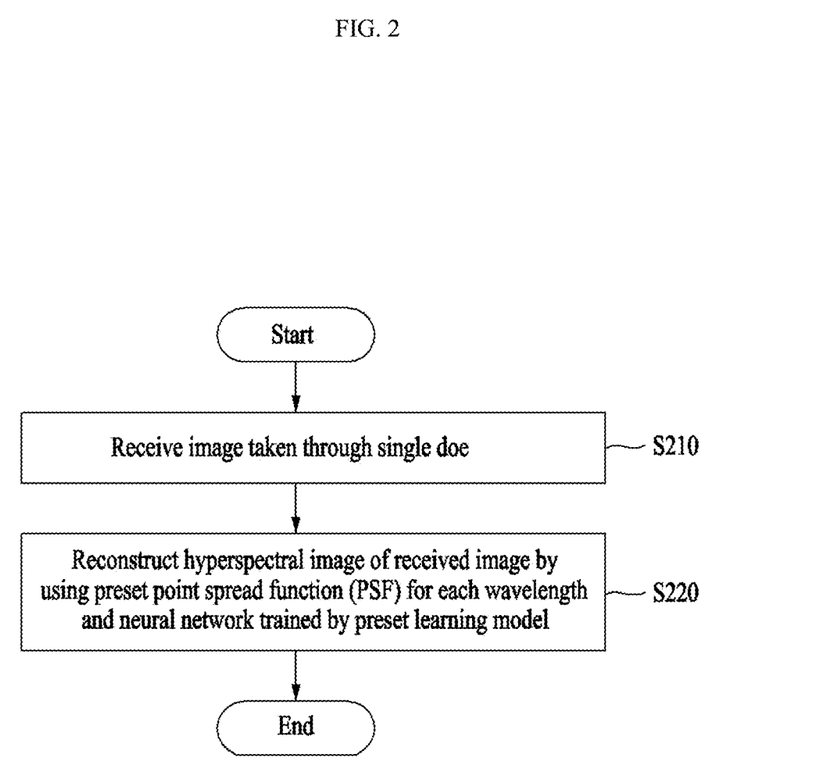
FIG. 2 is a flowchart illustrating a method of reconstructing a hyperspectral image according to an embodiment of the inventive concept.

FIG. 2 is a flowchart illustrating a method of reconstructing a hyperspectral image according to an embodiment of the inventive concept.

As illustrated in FIG. 2, a method according to an embodiment of the inventive concept includes receiving an image photographed through a single DOE in operation S210, and reconstructing a hyperspectral image of the received image based on information about a PSF for each preset wavelength and a neural network trained by a preset learning model in operation S220.

In this case, the DOE may produce an anisotropic shape of point spread functions varying with a spectrum. The method according to the inventive concept may receive the image photographed through the DOE and reconstruct the hyperspectral image of the image based on the received image and the previously trained neural network.

Figure 3:
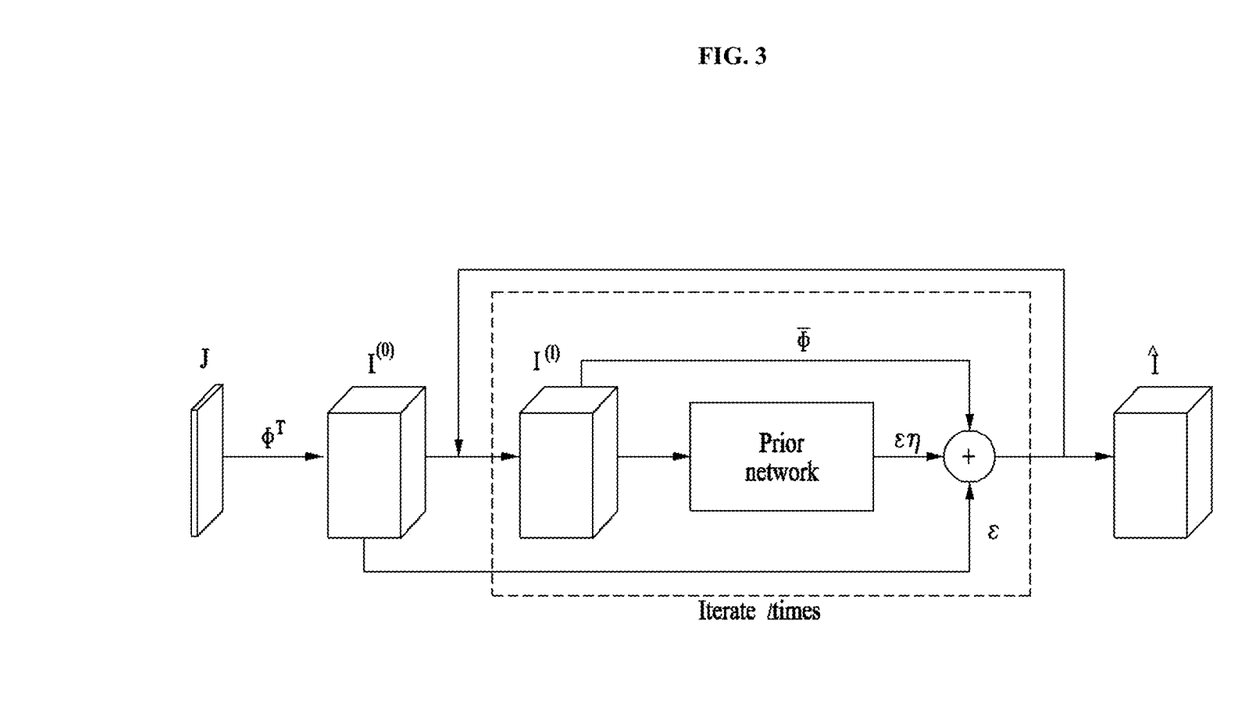
FIG. 3 is a view illustrating an example of a neural network architecture according to the inventive concept.
Figure 4:
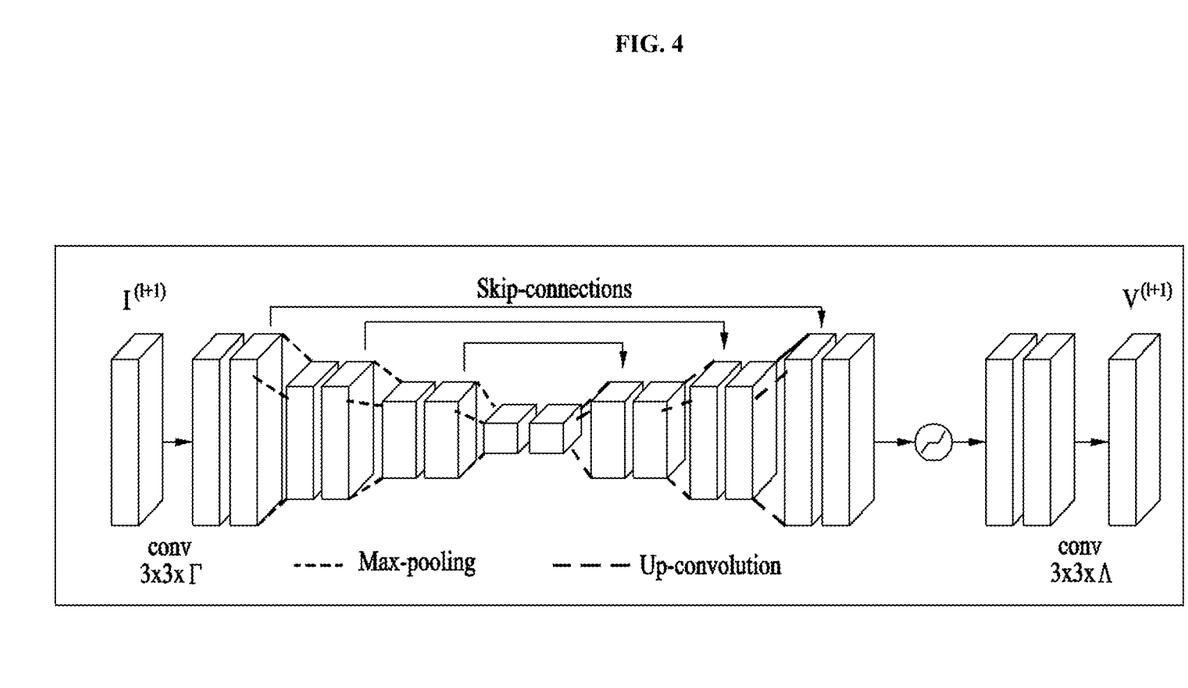
FIG. 4 is a view illustrating an example of the prior network illustrated in FIG. 3.

Hereinafter, such a method according to the inventive concept will be described in detail with reference to FIGS. 3 and 4.

Diffraction Model

The inventive concept deals with the basis of Fresnel diffraction to explain a diffraction model. The diffraction model for the diffraction image according to the inventive concept is as follows. It is assumed that a point light source that emits a wave field and shines light on a camera includes a diffractive lens and a bare image sensor at sensing depth 'z'. When imaging the wave field propagating from the source, the point spread function $p_\lambda(x, y)$ of a wavelength 'λ' means the intensity image of a sensor.

When it is assumed that monochromatic incident wave field $u_0$ at position (x', y') of the DOE coordinate system with amplitude 'A', phase '$\varphi_0$', and wavelength 'λ' passes through the diffractive optical element, the monochromatic incident wave field $u_0$ at position (x', y') may be expressed as following Equation 1.

$$u_0(x',y')=A(x',y')e^{i\phi_0(x',y')} \quad \text{[Equation 1]}$$

Phase shift $\varphi_h$ is generated by the DOE. The wave field $u_1$ passing through the DOE may be represented as following Equation 2.

$$u_1(x',y')=A(x',y')e^{i(\phi_0(x',y')+\phi_h(x',y'))} \quad \text{[Equation 2]}$$

Phase shift $\varphi_h$ at position (x', y') may be determined by height profile h (x', y') of the DOE, and the phase shift $\varphi_h$ at position (x', y') may be expressed as following Equation 3.

$$\phi_h(x', y') = \frac{1}{\lambda}\Delta\eta_\lambda h(x', y') \quad \text{[Equation 3]}$$

Where $\Delta\eta_\lambda$ may mean a difference between the air per wavelength 'λ' and the diffraction indexes of a DOE substrate.

When the wave field reaches the image sensor, the wave field $u_2(x', y')$ of the sensor plane at depth 'z' on the DOE may be obtained from the wave field $u_1$ (x', y') by the Fresnel diffraction law. In the case of λ<<z, $u_2$ (x', y') may be expressed as following Equation 4.

$$u_2(x, y) = \frac{e^{ikz}}{i\lambda z} \int\int u_1(x', y')e^{i\frac{k}{2z}\{(x-x')^2+(y-y')^2\}}dx'dy' \quad \text{[Equation 4]}$$

Where k=2π/λ may mean a wavenumber, also called a spatial frequency of a wave.

Plane wave assumption: The inventive concept is designed to work indefinitely as an optical system. In this setup, the incident light output from the light source along the optical axis may be represented by plane wave $u_0$ (x', y')=$Ae^{i\phi_0}$ with constant amplitude 'A' and constant phase $\varphi_0$, which alleviates the mathematical complexity of designing the DOE. The incident wave field $u_2$ on the sensor plane may be obtained from Equations 2 and 4, and may be expressed as following Equation 5.

$$u_2(x, y) = \frac{e^{ikz}}{i\lambda z} \int\int Ae^{i\{\phi_0+\Delta\phi_h(x',y')\}}e^{i\frac{k}{2z}\{(x-x')^2+(y-y')^2\}}dx'dy' \quad \text{[Equation 5]}$$

PSF $p_\lambda(x, y)$ may mean the intensity of the square root of the wave field $u_2$.

Finally. when the point light is given, by representing the Fresnel integration in the Fourier transform, pλ (x, y) may be formulated as following Equation 6.

$$p_\lambda(x, y) \propto \left|\mathcal{F}\left[Ae^{i\phi_h(x',y')}e^{i\frac{\pi}{\lambda z}(x'^2+y'^2)}\right]\right|^2 \quad \text{[Equation 6]}$$

Diffractive Hyperspectral Imaging

The hyperspectral imaging method according to the inventive concept, unlike a conventional hyperspectral imaging method, includes a single optical element and a conventional bare image sensor. The diffractive optical element in the inventive concept replaces general optical elements of the hyperspectral image, such as distributed optical elements, coded apertures, and relay lenses, with a single DOE to greatly reduce the form factor of the hyperspectral imager. On the other hand, the minimum optical configuration according to the inventive concept has difficulty in reconstructing the hyperspectral image from the compressed input. This is because the error of the spectral reconstruction is significantly increased due to the absence of the core optical element of the hyperspectral image, for example, the dispersive element and the coded aperture. The inventive concept may alleviate errors by introducing a new design of the diffractive optical element in which the point spread function by the DOE varies with the spectral wavelength and the anisotropic shape of the PSF, which varies with the spectrum, is rotated at an unchanging magnitude. This design may be an important signal for spectral reconstruction.

Spectral Image Formation

The inventive concept captures a hyperspectral image with a conventional RGB image sensor in a situation where the illumination is not naturally constant. Thus, although the image formation according to the inventive concept includes a camera response function through a color filter, the quantum efficiency function of the monochromatic sensor may be generally used. It is assumed that the hyperspectral image $I_\lambda$ (x, y) with the spectrally varying point spread function $p_\lambda$ (x, y) from the RGB image captured by the sensor $J_c$(x, y), and the sensor spectral sensitivity function $\Omega c$(x, y) for each color channel $c \in \{r, g, b\}$ exists in the sensor. The captured image $J_c$ may be expressed as following Equation 7.

$$J_c(x,y) = \iiint \Omega_c(\lambda) I_\lambda(\mu,v) p_\lambda(x-\mu, y-v) d\mu dv d\lambda \quad \text{[Equation 7]}$$

The spectral image forming model may be simply expressed as following Equation 8.

$$J_c(x,y) = \int \Omega_c(\lambda)(I_\lambda * p_\lambda)(x,y) d\lambda \quad \text{[Equation 8]}$$

Where * may mean a convolution operator.

The inventive concept may represent an image forming model in discrete vector and matrix form. $I \in \mathbb{R}^{WH\Lambda \times 1}$ is the original hyperspectral image vector, $J \in \mathbb{R}^{WH3 \times 1}$ is the RGB image vector captured, and W, H and $\Lambda$ are the width, height, and number of wavelength channels of the spectral image, respectively. The convolution by the sensor sensitivity $\Omega_c(\lambda)$ and PSF $p_\lambda$(x, y) may be represented by matrices $\Omega \in \mathbb{R}^{WH3 \times WH\Lambda}$ and $P \in \mathbb{R}^{WH\Lambda \times WH\Lambda}$. The measurement matrix $\Phi \in \mathbb{R}^{WH3 \times WH\Lambda}$ is the product of $\Omega$ and P. The continuous image forming model of Equation 8 may be represented in a discrete matrix form and may be expressed as following Equation 9.

$$J = \Phi I \quad \text{[Equation 9]}$$

Spectral Reconstruction in Diffraction

The spectral reconstruction problem of the inventive concept is to solve the following two sub-problems. First, when capturing input data, each spectral channel is connected to a point spread function that varies with the spectrum. Thus, non-blind deconvolution is required to reconstruct a clear spectral channel. Second, a blurry spectral channel of the entire visible spectrum is also projected onto the three color channels of the image sensor (one channel for a monochrome sensor). The combination of these two inverse problems greatly increases the prediction error of the spectral reconstruction. A conventional spectral reconstruction method mainly takes the data-driven approach that formulates the optimization problem of learning the prior information of a natural spectral image and reconstructing a hyperspectral image with a hand-crafted prior. These are not a complete end-to-end solution and also require a lot of computational cost in the optimization process. The inventive concept devises a complete end-to-end reconstruction method devised from an optimization process with a spatial spectral prior describing the diffractive rotation.

Optimization-Inspired Network

Because WH3<<WHA in Equation 9, the hyperspectral image reconstruction problem of the inventive concept is a seriously insufficient system. There may be many solutions that satisfy the input measurements. In order to reconstruct the hyperspectral image $\hat{I} \in \mathbb{R}^{WH\Lambda \times 1}$, the objective function of the spectral reconstruction requires a prior of the natural spectral image together with the following data items, and the hyperspectral image may be expressed as following Equation 10.

$$\hat{I} = \arg\min_I \|J - \Phi I\|_2^2 + \tau R(I) \quad \text{[Equation 10]}$$

Where R(.) may mean an unknown prior function of the natural image, and 'τ' may mean a weighting parameter of a prior item.

Because these normalization items are not necessarily distinguishable in optimization, by introducing an auxiliary variable $V \in \mathbb{R}^{WH\Lambda \times 1}$ and reformulating Equation 10 as a limited optimization problem, a data item and a normalization item may be separated, which may be expressed as following Equation 11.

$$\hat{I} = \arg\min_I \|J - \Phi I\|_2^2 + \tau R(V) \text{ s.t. } V = I \quad \text{[Equation 11]}$$

The half-quadratic splitting (HQS) method may convert Equation 11 into an optimization problem without constraint, and may be expressed as following Equation 12.

$$\hat{I} = \arg\min_I \|J - \Phi I\|_2^2 + \varsigma \|V - I\|_2^2 + \tau R(V) \quad \text{[Equation 12]}$$

Where 'ξ' may mean a penalty parameter.

Equation 12 may be solved by dividing into following Equation 13 and Equation 14.

$$I^{(l+1)} = \arg\min_I \|J - \Phi I\|_2^2 + \varsigma \|V^{(l)} - I\|_2^2 \quad \text{[Equation 13]}$$

$$V^{(l+1)} = \arg\min_V \|V - I^{(l+1)}\|_2^2 + \tau R(V) \quad \text{[Equation 14]}$$

Equation 13, which is a second optimization problem, may be repeatedly solved by a generalized Tikhonov normalization method expressed as following Equation 15.

$$I^{(l+1)} = (\Phi^T \Phi + \varsigma 1)^{-1} (\Phi^T J + \varsigma V^{(l)}) \quad \text{[Equation 15]}$$

Where $1 \in \mathbb{R}^{WH\Lambda \times WH\Lambda}$ may mean a unit matrix.

Because the measurement matrix of the spectral image is very large, the calculation of the inverse part of the equation requires a large calculation cost. In order to alleviate this cost problem, the conjugate gradient method may be generally adopted instead of solving Equation 13, which requires many iterations. Through such a manner, the solution of the l-th iteration may be expressed as following Equation 16.

$$I^{(l+1)} = I^{(l)} - \varepsilon \left[ \Phi^T (\Phi I^{(l)} - J) + \varsigma (I^{(l)} - V^{(l)}) \right] \quad \text{[Equation 16]}$$

$$= \overline{\Phi} I^{(l)} + \varepsilon I^{(0)} + \varepsilon \varsigma V^{(l)}$$

Where $\overline{\Phi}$ may be expressed as $\overline{\Phi} = [(1-\varepsilon\varsigma)1 - \varepsilon\Phi^T\Phi] \in \mathbb{R}^{WH\Lambda \times WH\Lambda}$, and ε may mean a slope falling step size.

In each optimization iteration step, the hyperspectral image $I^{(l+1)}$ is updated in three parts. The first part calculates the slope of the measurement matrix by multiplying $I^{(l)}$ by $\overline{\Phi}$. The second part is derived from $I^{(0)} = \Phi^T J$ weighted by parameter 'ε'. The third part calculates the prior item weighted by εξ. The optimization iteration is repeated L times. FIG. 3 is a view illustrating an example of the neural network architecture of the inventive concept. The above-described process, which is configured as a neural network architecture, includes a prior network shown in FIG. 3 and consists of a chain of sub-network architectures that have been deployed L times, where a parameter is determined in an end-to-end manner.

Hyperspectral Prior Network

Because the HQS algorithm separates the measurement matrix from an unknown regularizer R (.), the prior item of Equation 14 may be represented in the form of a proximal operator. Instead of using a hand-crafted natural image prior like the TV-$1_1$ norm, the inventive concept may define a neural network function S(.) that solves Equation 14 with soft-thresholding to calculate the auxiliary parameter of the image prior $V^{(l+1)}$, and may be expressed as following Equation 17.

$$V^{(l+1)} = S(I^{(l+1)}) \quad \text{[Equation 17]}$$

The inventive concept proposes a prior network architecture for the following two main purposes. First, the network must learn both spatial and spectral priors of a natural spectrum image. Second, the network must reconstruct the spectral image by the diffractive rotation of the PSF. In order to account for deconvolution with a relatively large kernel, the inventive concept employs a multiphase neural network, for example, U-net as shown in FIG. 4, to utilize a multiscale architecture structure to cover a wider receptive field. In the network according to the inventive concept, the first convolutional layer uses a 3×3×Λ filter to produce a tensor of characteristic size Γ. The network then generates a multiscale feature with a contracting path together with the maximum pooling and an expansive path with an up-convolution layer. At each level, two convolution layers encode the spatial spectral feature. By using a skip connection, the scaled feature is concatenated with the upper scale feature. Finally, a tensor of the original hyperspectral cube size having a 3×3×Λ filter convolution layer is generated. The inventive concept learns the entire network with an end-to-end learning method that includes weighting and optimization parameters ε and ξ. All these parameters are learned individually for each stage through L iterations because the optimization parameters are adaptively updated as the input quality of the stage increases as the input quality of each stage increases.

In detail, the U-Net includes an encoder, a decoder and a connection of the encoder and the decoder. The encoder typically extracts the hierarchical structure of an image feature map from low to high complexity, while the decoder transforms the feature and reconstructs the output from low resolution to high resolution. An encoder-decoder skip connection performs a key function in the decoder to compensate for high-frequency information loss during pooling by using a high-resolution feature as an additional input in the encoder.

In this case, the U-Net may include a convolutional layer (Cony) performing a linear transformation, a batch normalization layer (BN) performing a normalization operation, a rectified linear unit (ReLU) layer performing a nonlinear function operation, and a channel concatenation layer or a channel sum layer combines the outputs of the plurality of layers. Each stage may include four sequential layers including convolution having 3×3 kernels, batch normalization and ReLU layers.

In addition, a skip connection may be included between the encoder and the decoder. In this case, the skip connection may compensate for the high frequency lost during the pulling. Of course, the neural network in the inventive concept may include various types of neural networks such as a convolutional neural network, and the like.

Recently, by adopting the existing ADMM and ISTA methods in the form of a neural network, many optimization-inspired reconfiguration methods such as ADMM-Net and ISTA-Net have been proposed. In particular, a method according to the inventive concept introduces a recent neural network into a hyperspectral reconstruction problem, which has three main differences. First, the error of the spectral reconstruction problem of the inventive concept is greater than others. This is because the rotation PSF of the inventive concept occupies a larger area than other general PSFs. To address these features, the inventive concept designs a space-spectral prior network having a U-net architecture to make a perceptual field wide, and combines it with soft-thread holding. Second, instead of using a handcrafted sparsity prior, the spatial spectral prior is learned that are not directly known in a natural spectral image. To this end, the optimization problem is formulated to differentiate using the HQS formula solved by Tikhnov normalization. Finally, it is possible to compensate for the absence of a sparse prior in the network of the inventive concept by using the $1_1$-nom loss function in network learning.

As described above, the method according to an embodiment of the inventive concept may inversely utilize the phenomenon in which the shape of the point spread function of the photograph taken through the diffraction optical element (DOE) varies depending on the spectrum of light reflected by the corresponding object and analyze the point spread function for each area of each image, thereby obtaining hyperspectral information.

In addition, the method according to an embodiment of the inventive concept may generate a three-dimensional image by estimating the distance of the object by using two small hyperspectral cameras capable of acquiring hyperspectral information.

In addition, because the method according to an embodiment of the inventive concept can perform hyperspectral observation by using a lensless system, the size may be made very small compared to an existing hyperspectral observation system, so that it is possible to greatly increase the convenience in use due to such an advantage. That is, the inventive concept may produce a diffractive optical pattern thinner than the thickness of a general lens through the diffractive optical element, and make it possible to make a lensless camera, that is, a camera having no lenses, by using an optical construction having a much smaller size than the optical elements of a conventional camera.

Figure 5:
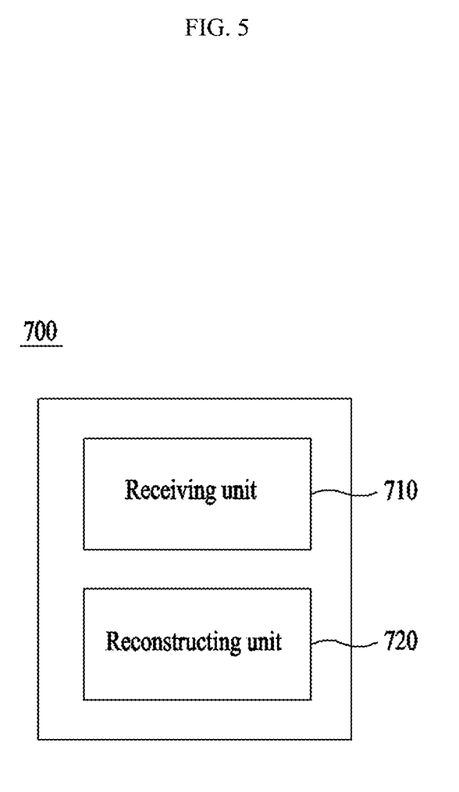
FIG. 5 is a view illustrating a configuration of a hyperspectral image reconstruction apparatus according to an embodiment of the inventive concept.

FIG. 5 is a view illustrating a configuration of a hyperspectral image reconstruction apparatus according to an embodiment of the inventive concept, which corresponds to a camera apparatus.

Referring to FIG. 5, a hyperspectral image reconstruction apparatus 700 according to an embodiment of the inventive concept includes a receiving unit 710 and a reconstructing unit 720.

The receiving unit 710 receives the image taken through a diffractive optical element.

In this case, the diffractive optical element may generate an anisotropic shape of a point spread function that varies with a spectrum.

The reconstructing unit 720 reconstructs the hyperspectral image of the received image based on the wavelength spread function (PSF) information for each wavelength of the diffractive optical element and the image received through the receiving unit 710.

In this case, the reconstructing unit 720 may reconstruct the hyperspectral image of the received image based on the point spread function information for each wavelength, the received image, and the neural network trained by a previously generated learning model.

In this case, the neural network may learn both the spatial prior and the spectral prior of the hyperspectral image by the learning model, and may reconstruct the spectral image by the diffractive rotation of the point spread function. Such a neural network may include a convolutional neural network and a multiphase neural network, for example, U-Net.

Further, the reconstructing unit 720 may reconstruct the hyperspectral image for the received image by reflecting the optimization technique for the diffractive rotation of the point spread function, and furthermore, by repeatedly performing the optimization technique the specified number of times, may reconstruct the hyperspectral image of the received image.

Although the description is omitted in the apparatus of FIG. 5, the apparatus of FIG. 5 may include all of the contents described with reference to FIGS. 1 to 4, and these matters will be appreciated by those skilled in the art.

In addition, the inventive concept may implement a hyperspectral image reconstruction system by using a diffractive optical element and a camera device. That is, the hyperspectral image reconstruction system may be implemented by using the above-described diffractive optical element and the camera device including the apparatus of FIG. 5. Of course, the camera device is not limited to a camera, and may include any kind of device capable of taking an image through a diffractive optical element.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, it is intended that the inventive concept covers other realizations and other embodiments of this invention provided they come within the scope of the appended claims and their equivalents.

What is claimed is:

1. A method of reconstructing a hyperspectral image, the method comprising:

receiving an image photographed through only a single diffractive optical element attached to a single bare image sensor, wherein an imaging lens includes the single diffractive optical element; and reconstructing a hyperspectral image of the received image based on the received image and information about a point spread function for each wavelength of the diffractive optical element, wherein the single diffractive optical element has a diffractive rotation property that spectrally rotates a shape of the point spread function.

2. The method of claim 1, wherein the single diffractive optical element is configured to generate an anisotropic shape of the point spread function that varies with a spectrum.

3. The method of claim 1, wherein the reconstructing of the hyperspectral image includes:

reconstructing the hyperspectral image of the received image based on the information about the point spread function for each wavelength, the received image, and a neural network trained by a previously generated learning model.

4. The method of claim 3, wherein the neural network is configured to learn a spatial prior and a spectral prior of the hyperspectral image by the learning model, and reconstruct a spectral image by diffractive rotation of the point spread function.

5. The method of claim 1, wherein the reconstructing of the hyperspectral image includes:
reconstructing the hyperspectral image of the received image by reflecting an optimization technique for diffractive rotation of the point spread function.

6. The method of claim 5, wherein the reconstructing of the hyperspectral image includes:
reconstructing the hyperspectral image of the received image by repeating the optimization technique a specified number of times.

7. The method of claim 3, wherein the neural network comprises multiphase neural network.

8. An apparatus for reconstructing a hyperspectral image, the apparatus comprising:
a receiving unit configured to receive an image photographed through only a single diffractive optical element attached to a single bare image sensor, wherein an imaging lens includes the single diffractive optical element; and
a reconstructing unit configured to reconstruct a hyperspectral image of the received image based on the received image and information about a point spread function for each wavelength of the single diffractive optical element,
wherein the single diffractive optical element has a diffractive rotation property that spectrally rotates a shape of the point spread function.

9. The apparatus of claim 8, wherein the single diffractive optical element is configured to generate an anisotropic shape of the point spread function that varies with a spectrum.

10. The apparatus of claim 8, wherein the reconstructing unit is configured to reconstruct the hyperspectral image of the received image based on the information about the point spread function for each wavelength, the received image, and a neural network trained by a previously generated learning model.

11. The apparatus of claim 10, wherein the neural network is configured to learn a spatial prior and a spectral prior of the hyperspectral image by the learning model, and reconstruct a spectral image by diffractive rotation of the point spread function.

12. The apparatus of claim 8, wherein the reconstructing unit is configured to reconstruct the hyperspectral image of the received image by reflecting an optimization technique for diffractive rotation of the point spread function.

13. The apparatus of claim 12, wherein the reconstructing unit is configured to reconstruct the hyperspectral image of the received image by repeating the optimization technique a specified number of times.

14. The apparatus of claim 10, wherein the neural network comprises multiphase neural network.

15. A system for reconstructing a hyperspectral image, the system comprising:
a single diffractive optical element attached to a single bare image sensor, wherein an imaging lens includes the single diffractive optical element; and
a camera apparatus configured to take an image through only the single diffractive optical element, and reconstruct a hyperspectral image of the photographed image based on a point spread function information for each wavelength of the single diffractive optical element and the photographed image,
wherein the single diffractive optical element has a diffractive rotation property that spectrally rotates a shape of the point spread function.

16. The system of claim 15, wherein the single diffractive optical element is configured to generate an anisotropic shape of the point spread function that varies with a spectrum.

17. The system of claim 15, wherein the camera apparatus is configured to reconstruct the hyperspectral image of the received photographed image based on the information about the point spread function for each wavelength, the received image, and a neural network trained by a previously generated learning model.

18. The system of claim 15, wherein the camera apparatus is configured to reconstruct the hyperspectral image of the received photographed image by reflecting an optimization technique for diffractive rotation of the point spread function.

* * * * *